United States Patent [19]

Dodd et al.

[11] Patent Number: 4,862,868

[45] Date of Patent: Sep. 5, 1989

[54] ROTARY DRESSING ROLLER AND METHOD AND APPARATUS FOR DRESSING CUP-SHAPED GRINDING WHEELS

[76] Inventors: Harry D. Dodd, 553 Landing Rd. North; Harry Pedersen, 24 White Hill Dr., both of Rochester, N.Y. 14625

[21] Appl. No.: 205,041

[22] Filed: May 31, 1988

Related U.S. Application Data

[63] Continuation-in-part of Ser. No. 25,456, Mar. 13, 1987, abandoned.

[51] Int. Cl.⁴ .............................................. B24B 53/00
[52] U.S. Cl. ................................. 125/11 CD; 51/5 D; 51/325; 51/209 R
[58] Field of Search ....... 125/11 CD; 51/5 D, 124 L, 51/209, 325

[56] References Cited

U.S. PATENT DOCUMENTS

| | | | |
|---|---|---|---|
| 1,609,331 | 12/1926 | Trbojevich | 125/11 CD |
| 1,679,809 | 8/1928 | Bullock et al. | 51/46 |
| 1,689,565 | 10/1928 | Trbojevich | 125/11 CD |
| 2,763,102 | 9/1956 | Staples | 125/11 CD |
| 2,839,873 | 6/1958 | Baxter | 125/11 R |
| 3,213,567 | 10/1965 | King et al. | 51/3 |
| 3,566,854 | 3/1971 | Nissen | 125/11 CD |
| 3,598,100 | 8/1971 | Deprez et al. | 125/11 |
| 3,683,885 | 8/1972 | Kikuchi | 125/11 CD |
| 3,776,213 | 12/1973 | Clarke et al. | 125/11 CC |
| 4,143,637 | 3/1979 | Messey | 125/11 CC |
| 4,203,260 | 5/1980 | Fivian | 51/165.88 X |
| 4,423,570 | 1/1984 | Bartosek | 125/11 R |
| 4,535,566 | 8/1985 | Soper et al. | 51/124 L |
| 4,574,527 | 3/1986 | Craxton | 51/165.71 X |
| 4,589,231 | 5/1986 | Roberts | 51/124 L |
| 4,765,095 | 8/1988 | Wiener | 51/287 |
| 4,768,308 | 9/1988 | Atkinson, III et al. | 51/165.71 X |

FOREIGN PATENT DOCUMENTS

| | | | |
|---|---|---|---|
| 2510393 | 9/1976 | Fed. Rep. of Germany | 125/11 CD |
| 0796246 | 4/1936 | France | 125/11 CD |
| 0896678 | 2/1945 | France | 125/11 CD |
| 0155159 | 9/1983 | Japan | 51/5 D |
| 0048263 | 3/1985 | Japan | 51/71 |
| 0443750 | 9/1974 | U.S.S.R. | 125/11 CD |
| 2026360 | 2/1980 | United Kingdom | 125/11 CD |

OTHER PUBLICATIONS

"Grinding Machine for Spiral-Toothed Bevel Gears", Verzahntechnik Dr.-Ing. D. Weiner GmbH, West Germany.

Primary Examiner—Robert P. Olszewski
Assistant Examiner—Shirish Desai

[57] ABSTRACT

A rotary dressing roller of the generating type and a method and apparatus for dressing a substantially cup-shaped grinding wheel for longitudinally curved tooth gears. The rotary dressing roller 40 is provided with a base portion 42 which is rotatable mounted to the dressing motor 38 of a dressing apparatus 15. The dressing apparatus 15 is used to dress a grinding wheel 50. At the other end of base portion 42 there is provided a working portion 44 having an outer concave surface 45, an inner convex surface 46 and an outer cutting rim portion 47. The outer concave surface 45 and inner convex surface 46 of working portion 44 are shaped so as to allow dressing of the inside working surface 52 and outside working surface 54 of grinding wheel 50 by rotation of the rotary dressing roller 40 in a single direction.

32 Claims, 9 Drawing Sheets

ROTARY DRESSING ROLLER AND METHOD AND APPARATUS FOR DRESSING CUP-SHAPED GRINDING WHEELS

This is a continuation-in-part of application Ser. No. 07/025,456 filed Mar. 13, 1987, now abandoned.

The present invention is directed to a rotary generating dressing roller and a method and apparatus for dressing a cup-shaped grinding wheel for producing longitudinally curved tooth gears.

In the manufacture of curved tooth gears a cup-shaped grinding wheel is used. When the grinding wheel becomes worn to the point wherein it no longer is suitable for producing precise tooth surfaces, the grinding wheel is dressed (renewed) to its orginal cutting condition. The dressing operation may be accomplished by providing a diamond cutting point which removes the worn portion of the grinding wheel. However, a single cutting point is subject to wear relatively quickly thereby affecting the sharpness and precision of the grinding wheel.

Rotary dressing rollers may also be used to dress grinding wheels. Rotary dressing rollers may be of the "form" or "generating" type. In a form-type rotary dressing roller, the outer configuration of the rotary dressing roller is shaped so as to conform to a working surface of the grinding wheel to dress the entire profile of one side of the grinding wheel. This type of dressing roller is more expensive than a generating-type rotary dressing roller and is limited in use to a single grinding wheel profile configuration. Additionally, this type of roller is quite sensitive to localized wear at any point along its dressing surface.

A rotary dressing roller of the generating type contacts the grinding wheel at a single point and can be used to generate any desired configuration. For example, a known generating-type dressing roller is oriented with its axis aligned with a working surface on one side (e.g., inside) of the cup-shaped grinding wheel and is moved in a direction parallel to the working surface for generating the required profile. For dressing the working surface on the other side (e.g., outside) of the cup-shaped grinding wheel, the dressing roller is pivoted to a new orientation with its axis aligned with the other working surface and is rotated in the opposite direction relative to the direction of rotation of the grinding wheel. It is generally understood in the art that substantially the same relative motion between the cutting surface of the dressing roller and working surfaces of the grinding wheel is required to dress the inside and outside working surfaces to substantially equal sharpness. This requirement is met using the known generating-type dressing roller by rotating the roller in opposite directions relative to the rotational direction of the grinding wheel while dressing the inside and outside working surfaces of the grinding wheel, respectively. However, rotating the roller in one direction while dressing one of the working surfaces causes the cutting surface, usually in the form of bonded diamond grit, on the rotary dressing roller to form a wear pattern. When the roller is rotated in the opposite direction to dress the other side, the initial wear pattern tends to cause the abrasive grit to break free from the roller thereby reducing the useful life of the roller and the overall quality of the dressing operation. Known generating-type dressing rollers also tend to wear rapidly because most of the dressing stock of the grinding wheel is removed by a very limited zone of contact on the dressing roller.

Dressing mechanisms for rotating and transporting the known generating-type dressing roller of the prior art are undesirably complex and difficult to control during use to obtain the required accuracy. For example, the mechanisms are required to accurately pivot the axis of the dressing roller between two angular orientations for separately dressing working surfaces on opposite sides of the cup-shaped grinding wheel. A third orientation may be required for dressing the end surface of the grinding wheel. The dressing mechanisms are also required to provide an extended range of travel for the dressing roller in a direction substantially perpendicular to the grinding wheel axis. This extended range of travel is required to position diametrically opposite points on the circumference of the roller which dress the inside and outside working surfaces of the grinding wheel respectively.

Further, the known generating-type dressing roller is not appropriate for dressing "straddle-type" cup-shaped grinding wheels. In the straddle-type grinding wheel, the inside and outside working surfaces are mounted facing one another on separate concentric annular supports. It would not be possible to dress either working surface of the grinding wheel with the known generating-type roller because of interference between the roller and the working surface opposite the working surface of the grinding wheel to be dressed.

The present invention is directed to a rotary dressing roller of the generating type and to a method and apparatus for dressing a substantially cup-shaped grinding wheel for longitudinally curved tooth gears which minimize or overcome the problems of the prior art.

SUMMARY OF THE INVENTION

In one aspect of the present invention there is provided a rotary generating dressing roller for dressing a substantially cup-shaped grinding wheel for longitudinally curved tooth gears. The roller has a base portion for mounting the rotary dressing roller to a rotatable drive spindle. A working portion is provided at the other end of the base portion having an outer concave surface, an inner convex surface and an outer cutting rim portion connecting the outer concave surface and inner convex surface.

In another aspect of the present invention there is provided a method of dressing a substantially cup-shaped grinding wheel for longitudinally curved tooth gears having inside and outside working surfaces. The substantially cup-shaped grinding wheel is dressed by rotating the rotary generating dressing roller in the same direction for dressing both the inside and outside working surfaces of the grinding wheel.

In yet another aspect of the present invention there is provided a dressing apparatus for dressing a substantially cup-shaped grinding wheel having a rotary generating dressing roller and means for moving the rotary generating dressing roller with respect to the substantially cup-shaped grinding wheel. The rotary generating dressing roller has a configuration which allows dressing both working surfaces of the grinding wheel by rotating the dressing roller in a single direction.

In yet still another aspect of the present invention there is provided an apparatus for making longitudinally curved tooth gears having a rotatable substantially cup-shaped grinding wheel for making curved tooth gears, means for rotating the grinding wheel about its axis of rotation and means for dressing the grinding wheel. The means for dressing the grinding wheel includes a rotary generating dressing roller. The roller has a base portion and a working portion having an outer concave surface and an inner convex surface and an outer cutting rim portion connecting the concave surface and the inner convex surface. The outer cutting rim portion has an inner cutting surface and an outer cutting surface. Means are provided for moving the rotary dressing roller in a manner so as to dress the cup-shaped grinding wheel.

DETAILED DESCRIPTION OF THE DRAWINGS

Figure 3:
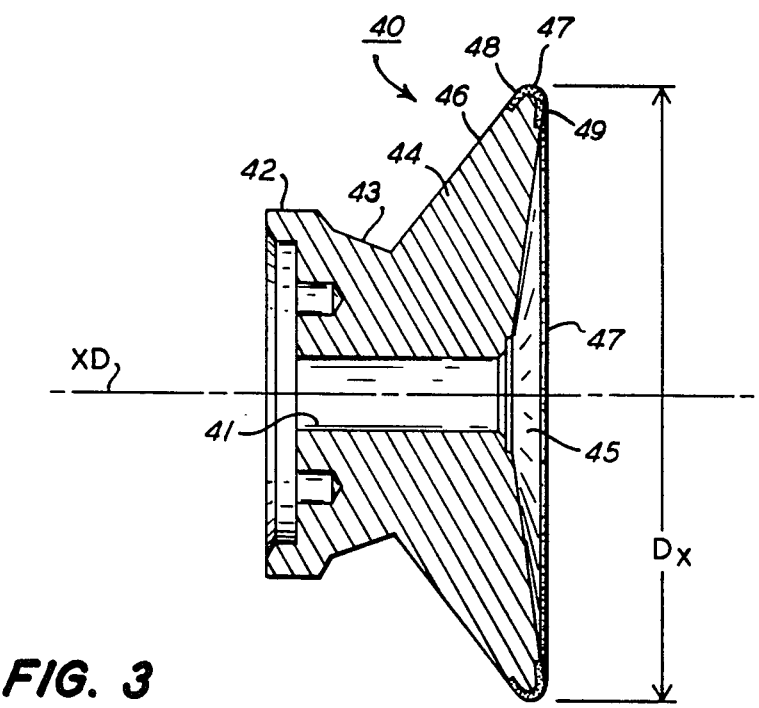
FIG. 3 is a cross sectional view of the rotary generating dressing roller of FIG. 2 taken along lines 3—3.
Figure 4:
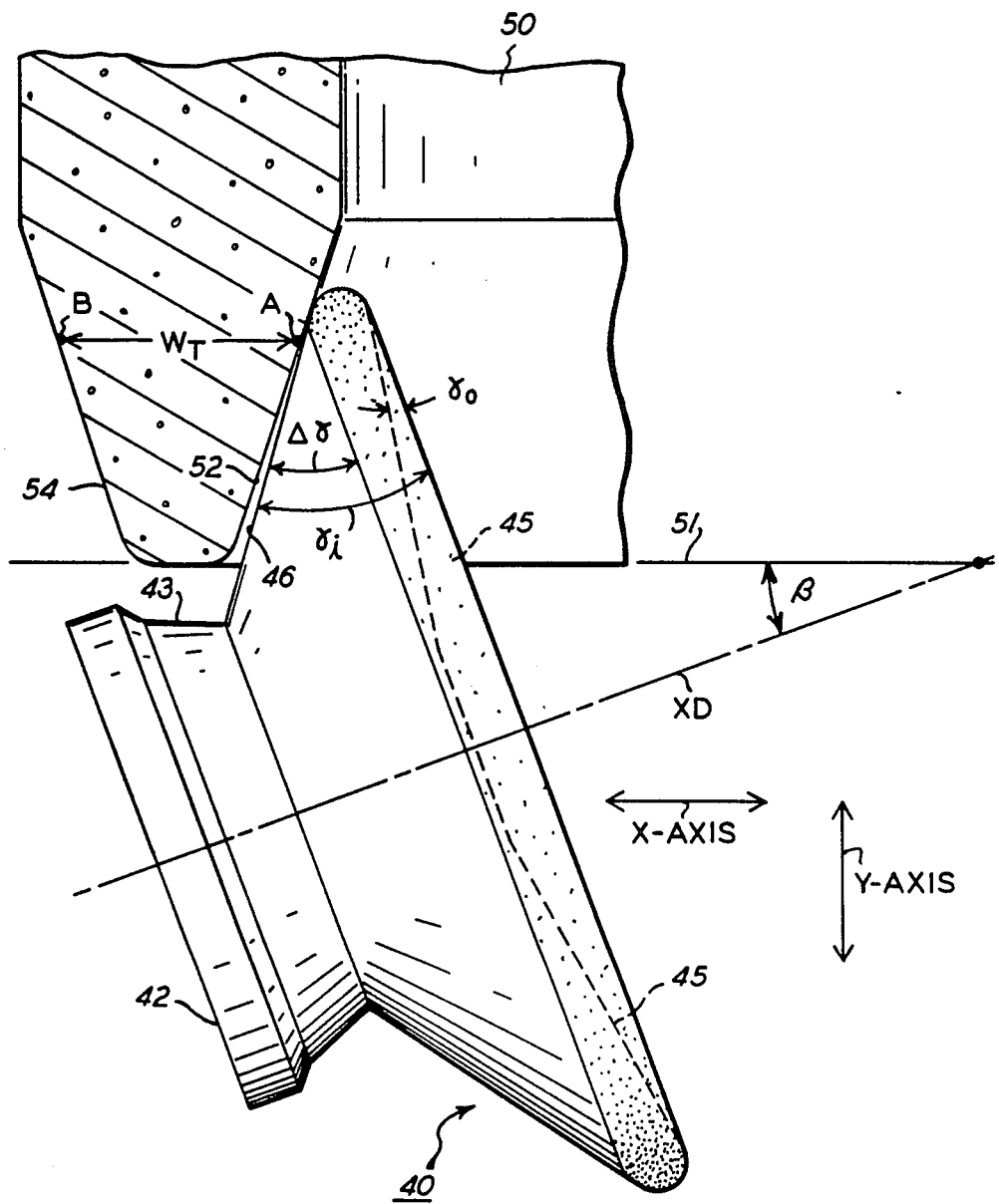
FIG. 4 is an enlarged side elevational view of the rotary dressing roller of FIG. 3 contacting the inside working surface of the grinding wheel for curved tooth gears.
Figure 5:
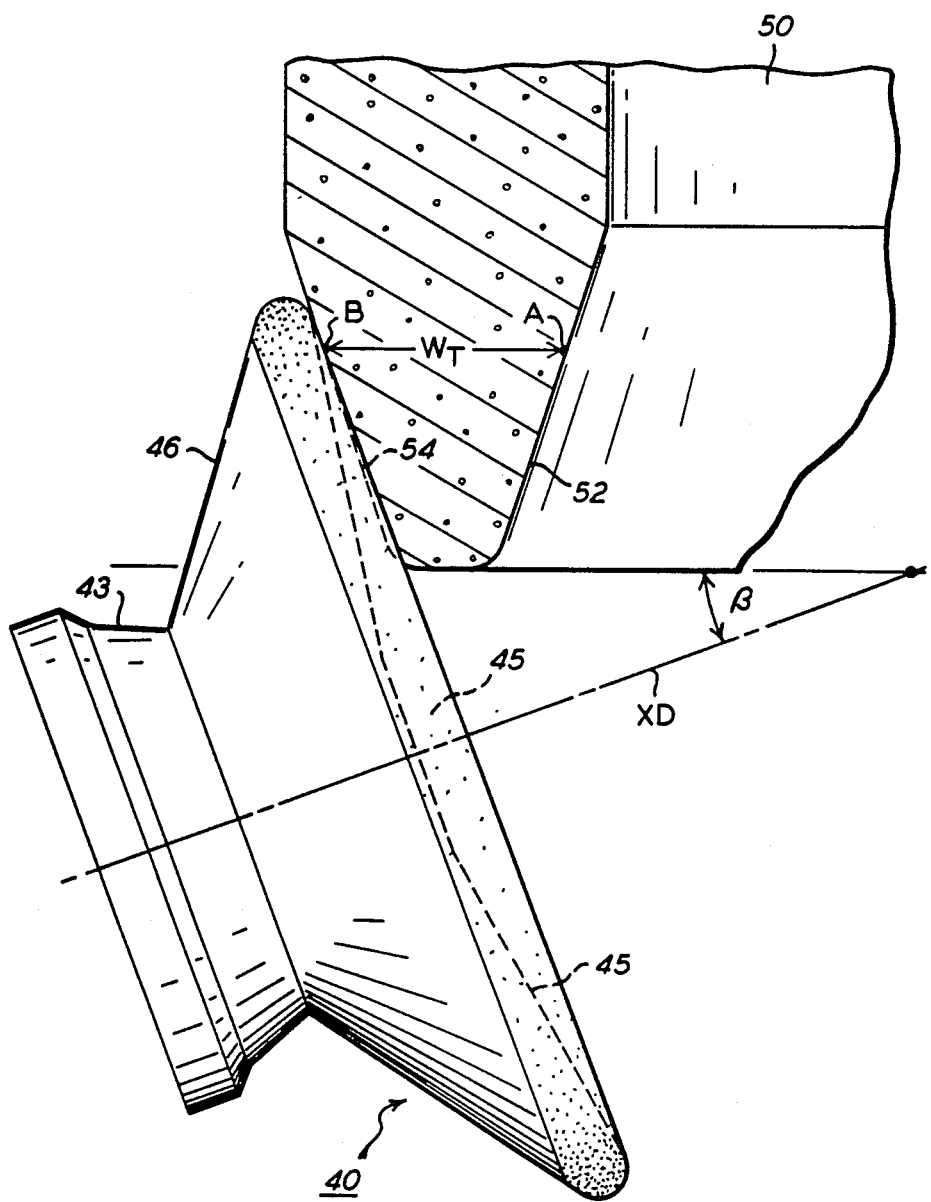
FIG. 5 is an enlarged side elevational view of the rotary dressing roller of FIG. 3 contacting the outside working surface of the grinding wheel for curved tooth gears.
Figure 6A:
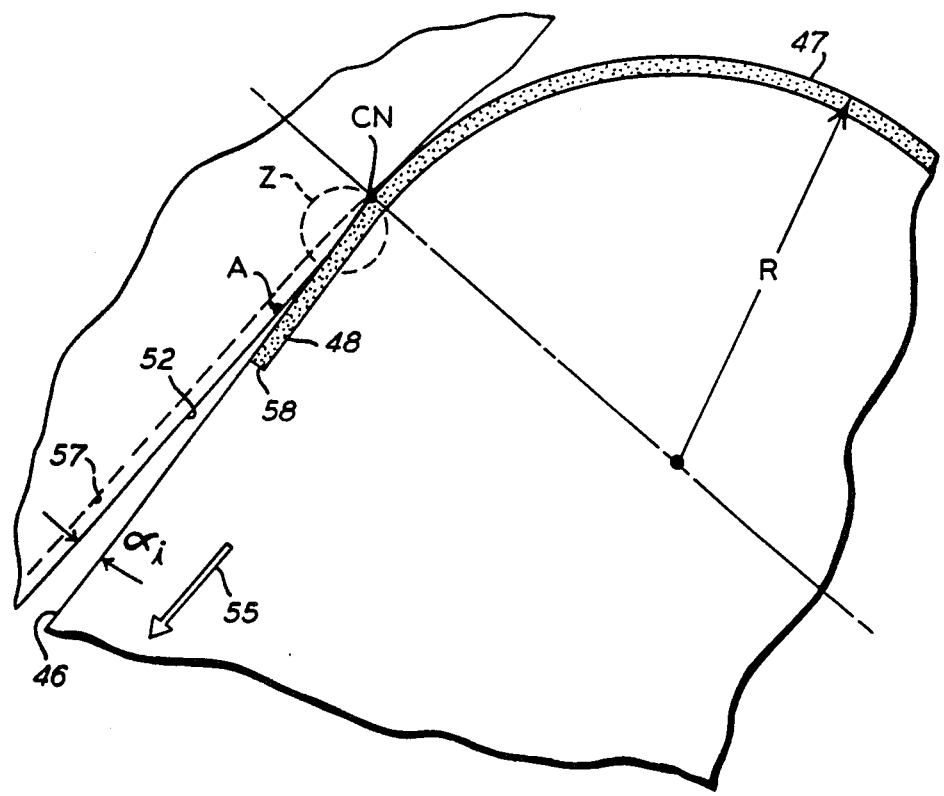
Figure 10:
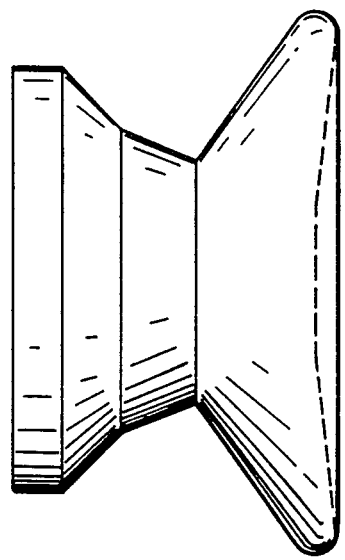
Figure 11:
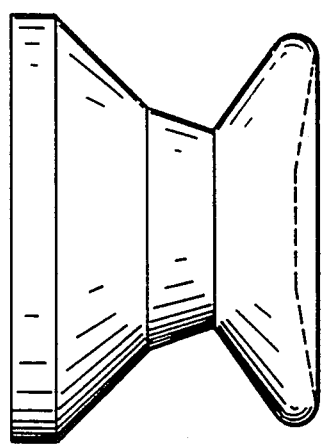
Figure 7:
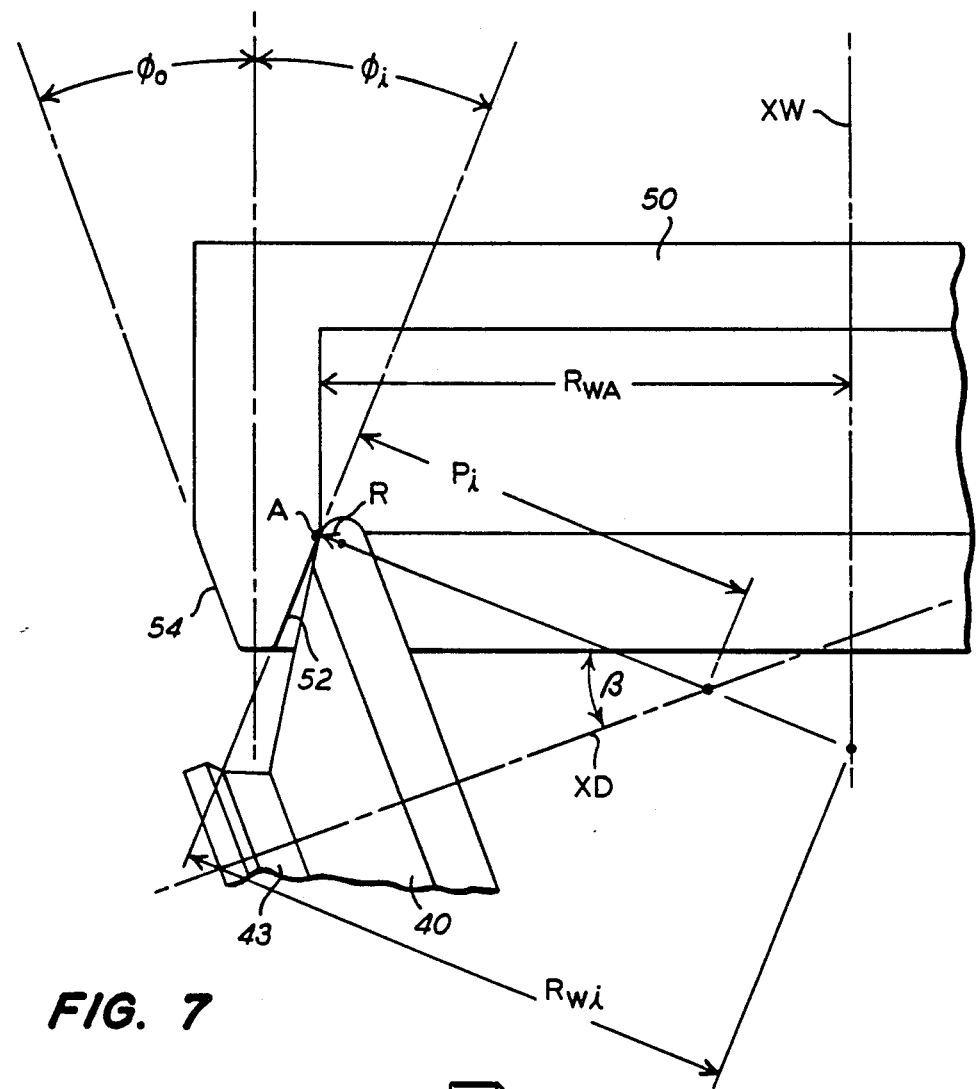
Figure 12:
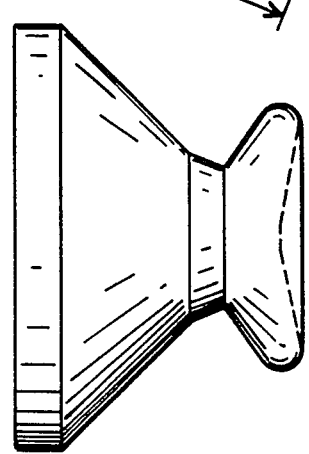
Figure 8:
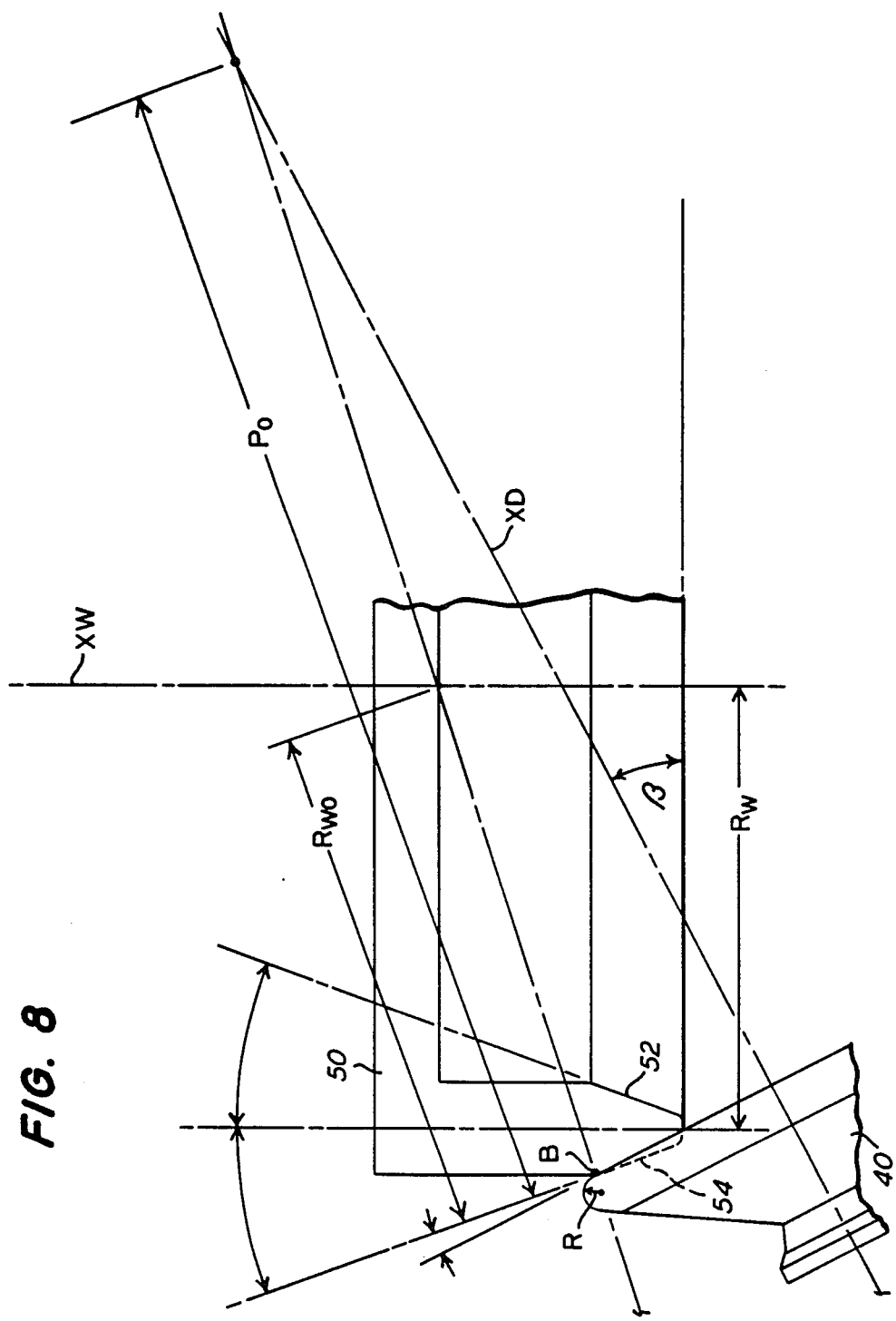
Figure 9:
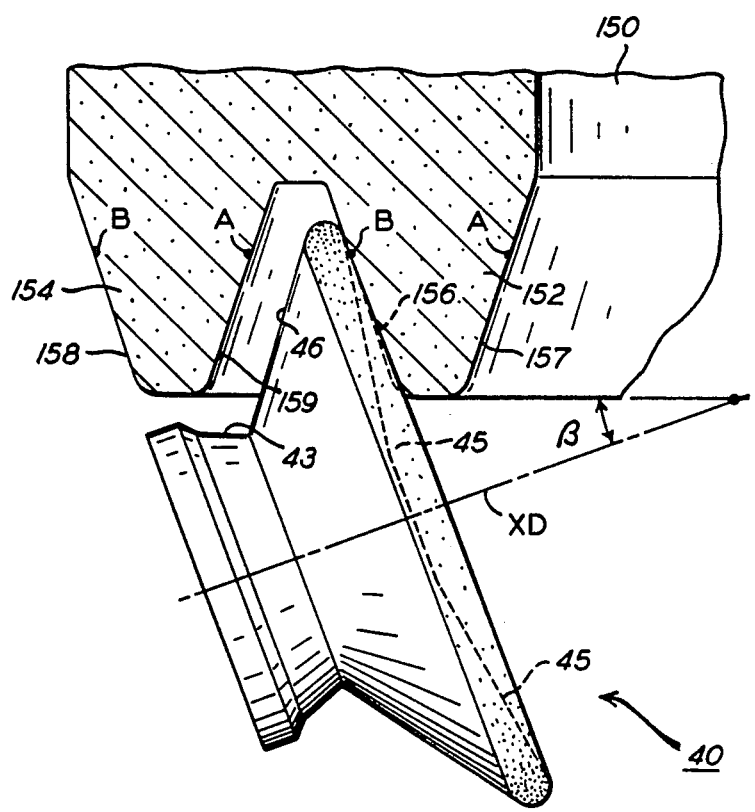

FIGS. 6a and b are enlarged fragmentary cross sectional views of FIGS. 4 and 5, respectively, illustrating the outer peripheral cutting surface of the dressing roller as it contacts the grinding wheel;

FIG. 7 is a diagramatical representation of the geometric properties of a dressing roller made in accordance with the present invention as it contacts the inside surface of the grinding wheel as taken along a plane passing through the axis of rotation of the rotary grinding wheel and rotary dressing roller;

FIG. 8 is a diagramatical representation of the geometric properties of a dressing roller made in accordance with the present invention as it contacts the outside surface of the grinding wheel as taken along a plane passing through the axis of rotation of the rotary grinding wheel and rotary dressing roller;

FIG. 9 is an enlarged side elevational view of the rotary dressing roller of FIG. 3 contacting a straddle type grinding wheel;

FIG. 10 is a side elevational view of a modified form of a dressing roller made in accordance with the present invention;

FIG. 11 is a side elevational view of another modified embodiment of a dressing roller made in accordance with the present invention; and FIG. 12 is yet another modified form of a dressing roller made in accordance with the present invention.

DETAILED DESCRIPTION OF THE INVENTION

Figure 1:
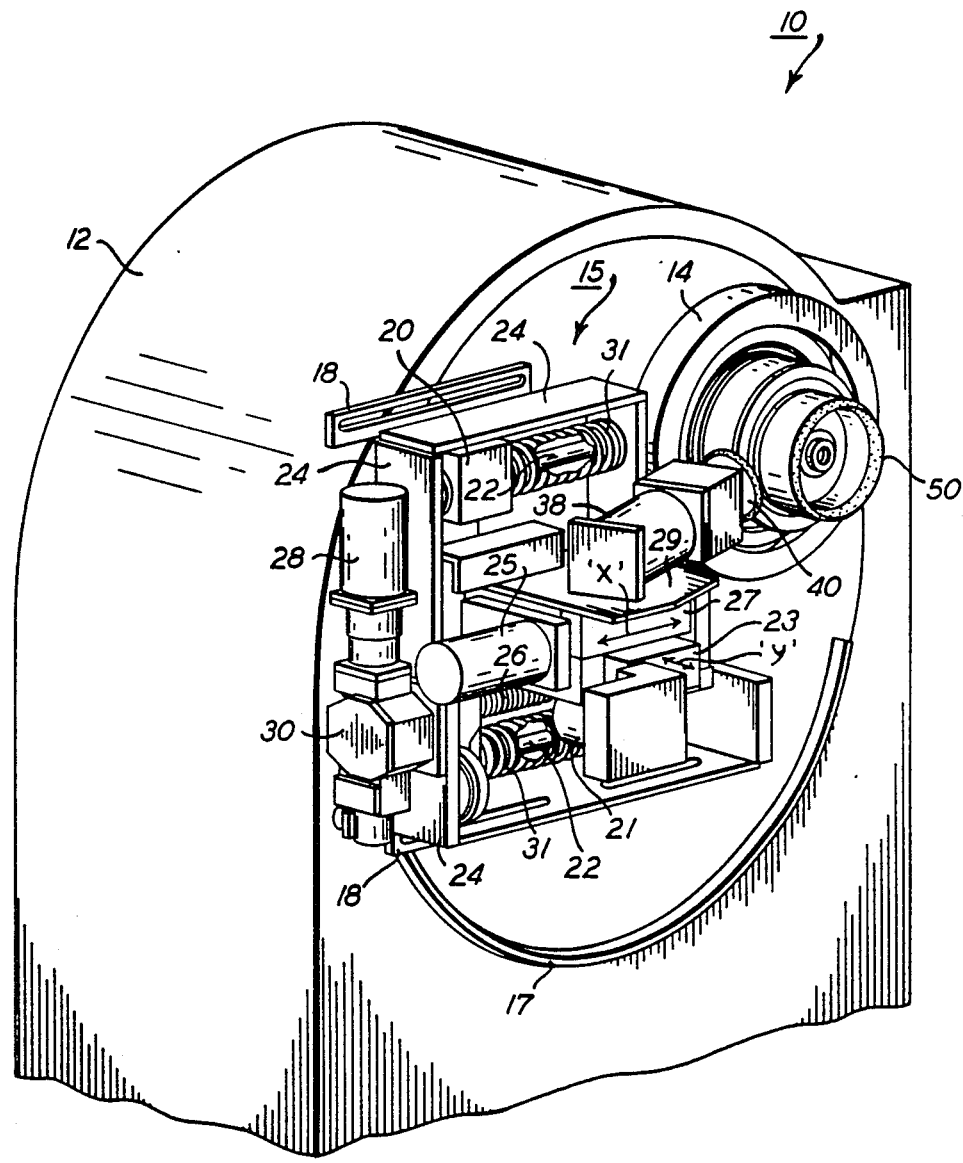
FIG. 1 is a fragmentary perspective view of an apparatus having a grinding wheel for making longitudinally curved tooth gears and an apparatus for dressing the grinding wheel.

Referring to FIG. 1 there is illustrated a fragmentary perspective view of an apparatus 10 used to make longitudinally curved tooth gears. The apparatus 10 comprises a support column 12 which supports a spindle housing 14 in which is mounted a substantially cup-shaped grinding wheel 50. Apparatus 10 is provided with an appropriate drive means (not shown) to rotate grinding wheel 50 about its axis. The particular means used to rotate wheel 50 and move spindle housing 14 may be of any conventional design presently used in the art. A dressing apparatus 15 pivotable about the grinding wheel axis is mounted to supporting column 12 within guideway 17 by a pair of mounting brackets 18. Secured to brackets 18 is a support frame 24 having a pair of guide rods 22 and a rotatable ball drive screw 26 secured thereto. Mounted to frame 24 is a ball screw drive motor 28 which engages a gear box 30 which turns ball drive screw 26. A support bracket 20 is slidably mounted to guide rods 22 and is caused to slide along guide rods 22 by a drive nut (not shown) secured to bracket 20 which is threadedly engaged to ball drive screw 26. Mounted to support bracket 20 is a "Y" axis drive motor 21 which moves slide 23 along the Y axis as illustrated by the arrow labelled "Y". Mounted to the top of slide 23 is an "X" axis drive motor 25 which moves slide 27 in the X axis direction as illustrated by arrow labelled by "X". A mounting plate 29 is securely mounted to the top of slide 27. A dressing motor 38 is mounted to plate 29 and has a dressing roller 40 rotatably mounted thereto. Bellows 31 are placed around guide rods 22 to protect them from the dust and grit in the environment.

The dressing apparatus as illustrated in FIG. 1 is in the fully retracted position. When it is desired to dress grinding wheel 50 the motor 28 is activated to turn ball screw 26 in the appropriate direction to move the support bracket 20 supporting Y axis and X axis drive motors 21, 25 toward grinding wheel 50. The motor 28 is used to obtain the approximate position of dressing roller for the dressing operation. The X axis and Y axis drive motors 21, 25 are operated so as to move dressing roller 40 in the appropriate path for dressing grinding wheel 50. Typically, the operation of drive motors 21, 25 are controlled by a microprocessor or other control means as is commonly done in the prior art. By appropriately controlling the operation of motors 21, 25 any desired configuration may be generated by dressing roller 40. In the particular embodiment illustrated the means for determining the positions of the slides 23, 27 is not illustrated as this may take any conventional form as is presently used as is well known to those skilled in the art.

Figure 2:
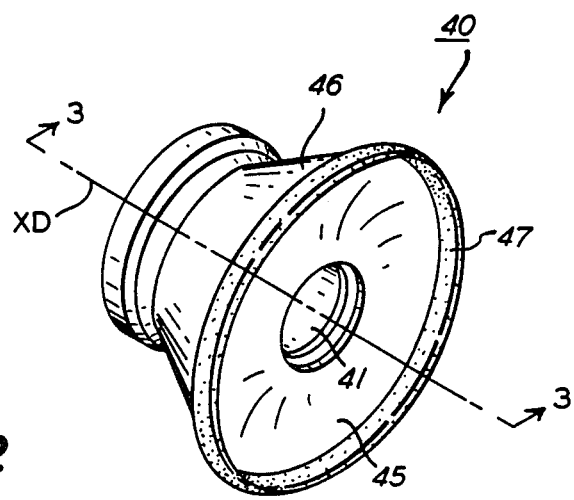
FIG. 2 is a perspective view of a rotary generating dressing roller made in accordance with the present invention.

Referring to FIGS. 2 and 3 the rotary dressing roller 40 comprises a base portion 42 which is mounted to the rotatable drive spindle (not shown) on dressing motor 38 in any conventional manner. In the particular embodiment illustrated, dressing roller 40 is provided with an axially centrally located opening 41 for receiving a retaining bolt (not shown) which is secured to the drive spindle of dressing motor 38. The rotary dressing roller 40 has a working portion 44 disposed at the other end of the base portion 42. In the particular embodiment illustrated, roller 40 is also provided with a necked portion 43 connecting base portion 42 and working portion 44 for providing clearance between the roller 40 and grinding wheel 50 during the dressing operation. The rotary dressing roller 40 is rotatable about central axis XD. Although the illustrated dressing roller 40 is shown with integral base portion 42 and necked portion 43, working portion 44 may be supported for rotation by other types of base portions which may be arranged to mount working portion 44 to a drive spindle and provide appropriate clearance for not interfering with the grinding wheel during use. In addition, the illustrated base and neck portions of dressing roller 40 could be incorporated into an arbor for supporting the dressing roller, whereas the base portion of the dressing roller may comprise only a mounting surface for the arbor. The working portion 44 comprises an outer concave surface 45, inner convex surface 46 and a connecting outer cutting rim portion 47. The outer cutting rim portion 47 comprises a relatively thin layer of diamond grit or other abrasive materials normally used for dressing grinding wheels. The outer cutting rim portion 47 has an inner cutting surface 48 and an outer cutting surface 49.

Referring to FIG. 4, there is illustrated a cross sectional view of the rotary dressing roller 40 in its position when it first contacts inside working surface 52 of grinding wheel 50. The axis XD of roller 40 is positioned at an angle $\beta$ with respect to a plane 51 which is perpendicular to the axis of rotation XW of the grinding wheel 50 (see FIG. 7).

Referring to FIG. 5, there is illustrated the rotary dressing roller 40 as it initially contacts the outside working surface 54 of grinding wheel 50. Rotary dressing roller 40 is disposed at an angle $\beta$ with respect to a plane perpendicular to the axis XW of grinding wheel 50 (see FIG. 8).

Referring to FIG. 6a there is illustrated an enlarged fragmentary cross sectional view of the outer cutting rim portion 47 of FIG. 4 after it has initially contacted the inside working surface 52 at its working depth. Outer cutting rim portion 47 has a substantially circular outer configuration having a radius R which provides a surface of revolution for dressing grinding wheel 50. In the particular embodiment illustrated, radius R is about 0.254 cm (0.1 inch), however, the rdius may be any desired value and is limited only by the structural integrity required of the roller 40. The outer rim portion 47 preferably follows this circular contour at least to the contact normal point CN. For the purposes of this invention the contact normal point CN is that point wherein the tangent of the surface of the dressing roller coincides with the tangent of the surface of grinding wheel 50. The inner cutting surface 48 of rim portion 47 extends at least to point 58 prior to where the rotary dressing roller 40 initially contacts the grinding wheel 50 as the rotary dressing roller 40 is brought along the grinding wheel 50.

When the rotary dressing roller 40 is first brought into contact with the grinding wheel 50, the rotary dressing roller 40 is positioned so that point of contact of the roller 40 with the grinding wheel 50 occurs at a point above point A (see FIG. 6a). Point A being defined as the point of maximum working depth of the inside working surface 52 of grinding wheel 50. Therefore, the roller 40 first contacts grinding wheel 50 at a point which is just beyond the region of the working surface used to make longitudinal curved tooth gears. After the roller 40 has been brought to its working depth, it is moved outward toward the tip of the grinding wheel 50, as indicated by arrow 55, dressing the inside working surface as it moves along. The dash line 57 indicating the shape of inside working surface 52 after the dressing operation. As the rotary dressing roller 40 is brought along inside working surface 52 the initial contact of inner cutting surface 48 with the inside working surface will occur at a zone Z, as indicated by circle shown in dash lines, prior to the contact normal point CN. Zone Z will take the brunt of initial contact with grinding wheel 50 thereby causing the greatest wear to occur prior to the contact normal point CN which provides the final configuration to the grinding wheel 50. Zone Z not only provides for removing a substantial portion of the abrasive material on the grinding wheel 50 which is ultimately removed by the dressing roller 40 but also helps preserve the diamond grit in the vicinity of the contact normal point CN. The inner cutting surface 48 in zone Z tends to wear back into the roller at an angle extending from the contact normal point and is a function of the depth of feed of the dressing roller 40. It can be appreciated that if the dressing roller 40 was moved in the opposite direction to arrow 55 along the working profile of the grinding wheel 50, the circular portion of outer cutting rim 47 would be first to contact the grinding wheel 50 and would be required to absorb most of the wear associated with such contact. This would result in increased wear at the normal contact point CN and would lead to inaccuracies in the dressed profile of the grinding wheel 50. The inner cutting surface 48 takes the form of underlying inner convex surface 46 of the working portion of the dressing roller 40. The inner convex surface 46 of the roller being configured so as to provide a clearance angle $\alpha_i$ with inside working surface 52 of the grinding wheel 50 of at least about 2°, preferably in the range of 2° to 6°.

Figure 6B:
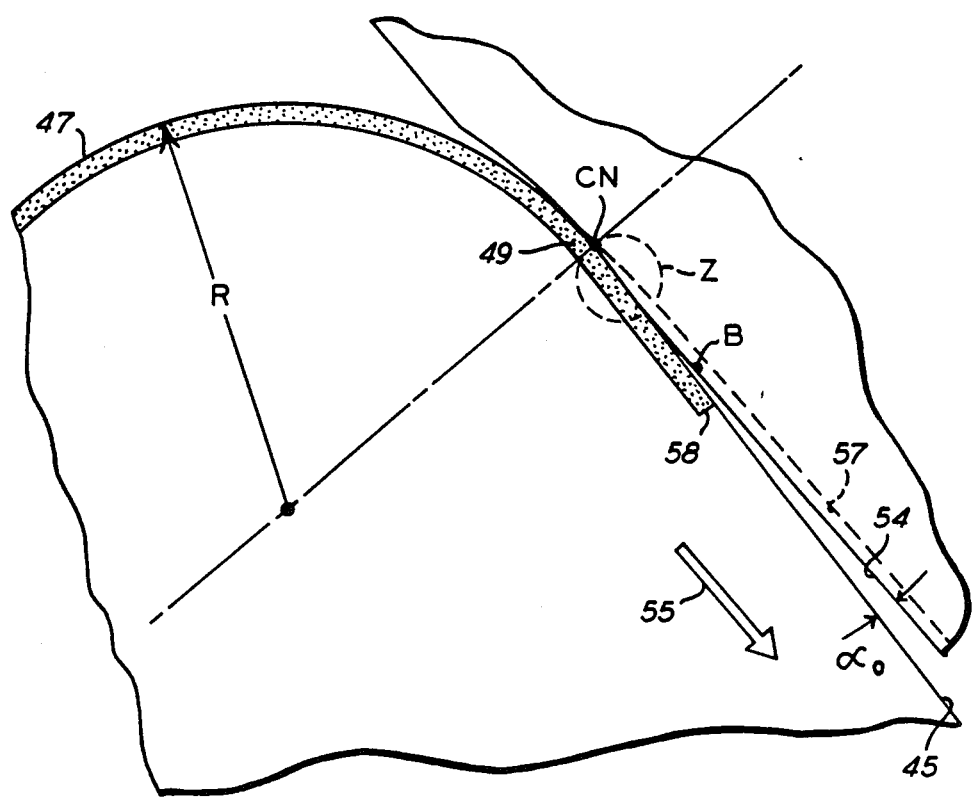

FIG. 6b illustrates the contact of the outer cutting rim portion 47 with the outside working surface 54 of grinding wheel 50. The outer cutting surface 49 of rim portion 47 is configured in the same manner as the inner cutting surface 48. The outer cutting surface 49 extends to a point 58 prior to where the roller 40 wherein first contacts grinding wheel 50. The rim portion 47 continues to follow a circular contour having a radius R, at least to the contact normal point CN. The preceding zone Z portion of cutting surface 49 functions in the same manner as zone Z on inner cutting surface 48. The outer cutting surface 49 takes the form of the underlying outer concave surface 45. A clearance angle $\alpha_o$ is provided between the outer concave surface 45 of the dressing roller 40 and the outside working surface 54 of grinding wheel 50 so as to prevent any substantial contact there between. Preferably clearance angle $\alpha_o$ is at least 2°, and generally between 2° and 6°.

Referring to FIG. 7 there is diagrammatically illustrated the rotary dressing roller 40 as it contacts the inside surface 52 of grinding wheel 50 at point A. The grinding wheel 50 has a axis of rotation XW about which the inside working surface 52 revolves. $\phi_i$ indicates inclination of the inside working surface 52 with respect to a line parallel to the axis of rotation XW. $\phi_o$ represents the angle of inclination of the outside working surface 54 with respect to a line parallel to the axis of rotation XW of the grinding wheel 50. $\phi_i$ and $\phi_o$ are commonly referred to in the art as the "pressure angle" of the inside working surface and the "pressure angle" of the outside working surface, respectively. From point A, on the grinding wheel 50 there is a normal radius of curvature of the inside working surface 52 identified as Rwi. Rwi is defined as the length of a line from point A, drawn normal to the inside working surface 52 to where it crosses the axis XW of grinding wheel 50. Pi is the effective radius of curvature of the inner cutting surface of the rotary dressing roller 40 and is defined as the length of a line from point A, drawn normal to the point of contact to where it crosses the axis XD of the rotary dressing roller 40. Likewise, as illustrated in FIG. 8, the outside working surface 54 of grinding wheel 50 has a normal radius of curvature Rwo at point B, point B being the maximum working depth of outside working surface 54. The rotary dressing roller 40 has an effective radius of curvature Po defined along the normal line from point B to axis XD of the roller.

It may now be appreciated that in order to achieve contact at point A without interference between the dressing roller 40 and the grinding wheel 50, the effective radius of curvature Pi of the dressing roller 40 must be less than normal radius of curvature Rwi of the inside surface 52 of the grinding wheel 50. Conversely, in order to achieve contact at point B without interference, the effective radius of curvature Po of the dressing roller must be greater than the normal radius of curvature Rwo of the outside surface 54 of the grinding wheel 50. In order to provide an optimum shape to roller 40 whereby the greatest potential amount of cutting surface is provided on the inside surface, while at the same time providing a roller 40 that will fit within the substantially cup-shaped grinding wheel 50, the dressing roller 40 is designed such that the effective radius of curvature Pi at point A is equal to some constant K times the normal radius of curvature (Pi=K X Rwi). Pi is generally no greater than about 80 percent of the normal radius of curvature Rwi of the inside working surface 52 [Pi≦0.8 Rwi]. The effective radius of curvature Po of outer cutting surface 49 of dressing roller 40 at point B is preferably greater or equal than about 1.25 times the normal radius of curvature [Po≧1.25 Rwo].

The effective radius of curvature Pi may be controlled by modifying the diameter $D_x$ of the dressing roller 40 or by modifying the inclination of angle β of axis $X_D$ with respect to a line perpendicular to the axis XD of grinding wheel 50. For example, a decrease in diameter $D_x$ or an increase in inclination angle β results in a decrease in effective radius of curvature Pi. It is preferred, however, that diameter $D_x$ be made as large as possible so that the point of contact between the dressing roller 40 and grinding wheel 50 will be dressed by as many diamond grits as possible positioned at the same radius about the circumference (i.e., surface of revolution) of the dressing roller 40. Accordingly, it is preferred to orient the dressing roller 40 at as large an angle β as possible so that the largest dressing roller 40 having a diameter $D_x$ may be used. However, the amount of permissible inclination of angle β may be limited by geometric constraints associated with dressing the outside working surface of the grinding wheel 50.

Referring to FIG. 8, there is illustrated the geometric relationships for determining the diameter and orientation of the dressing roller 40 with respect to point B of outside working surface 54 of the grinding wheel 50. In order to achieve contact at point B, the effective radius of curvature Po of the roller 40 must be larger than the normal radius of curvature Rwo of the outside working surface 54 of the grinding wheel 50 at point B. As angle β increases, the effective radius of curvature Po decreases and the difference between radii of curvature Po and Rwo is also decreased. Thus, although an increase in angle β permits a desirable increase in roller diameter $D_x$ for dressing the inside working surface 52, large increases in angle β may undesirably decrease the effective radius of curvature Po and lead to interference between the dressing roller and the outside working surface 54 of the grinding wheel 50. It is preferred that the roller 40 be made in accordance with the following relationship:

$$Po - Rwo \geqq Rwi - Pi$$

wherein:
Po = effective radius of curvature of the outer cutting surface of said rotary dressing roller at the maximum working depth of the grinding wheel.
Pi = the effective radius of curvature of the inner cutting surface of said rotary dressing roller at the maximum working depth of the grinding wheel.
Rwo = the normal radius of curvature of the outside working surface of the grinding wheel at the point of contact with the dressing roller at the maximum working depth.
Rwi = the normal radius of curvature of the inside working surface of the grinding wheel at the point of contact with the dressing roller at the maximum working depth.

In the preferred embodiment angle β is fixed for dressing both sides of grinding wheel 50 and preferably lies in a range between βmin and βmax as defined by the following relationships:

$$\beta\text{max} = \text{Arcsin} \frac{(.5\ Dx - R)}{(1.25\ Rwo + R)} + \phi o$$

and $$\beta\text{min} = \text{Arcsin} \frac{(.5\ Dx - R)}{(.80\ Rwi - R)} - \phi i$$

wherein:
Pi is the effective radius of curvature of inner cutting surface 48 of dressing roller 40, Po is the effective radius of curvature of outer cutting surface 49 of dressing roller 40, R is the radius of the circular contour of rim portion 47 joining inner cutting surface 48 and outer cutting surface 49, Dx is the diameter of dressing roller 40,
$\phi_o$ (pressure angle) is the angle of inclination of the outside working surface 54 of grinding wheel 50 and $\phi_i$ (pressure angle) is the angle of inclination of the inside working surface of the grinding wheel 50.

Although for economic reasons it is preferred that the diameter $D_x$ of the dressing roller does not exceed 12.7 cm (5 inches) it is important that Dx be selected so that βmax is greater than or equal to βmin to define a preferred range of values for β, and it is otherwise preferred that diameter $D_x$ meets the following relationship:

$$D_x \geqq 2Rwa \times TAN\ (\phi_i)$$

wherein:
Rwa is the radius of the grinding wheel 50 at point A on inside working surface 52 (see FIG. 7) and TAN ($\phi_i$) is the tangent function of the pressure angle of inside working surface 52 at point A.

A rotary dressing roller made in accordance with the present invention has a configuration such that the outer cutting rim 47 may be used to cut both the inside working surface 52 and the outside working surface 54. It should be appreciated that the particular cross sectional configuration of roller 40 may vary greatly and is dependent upon the orientation of roller 40 with the grinding wheel 50 during the dressing operation for both the inside working surface 52 and outside working surface 54. The outer concave surface 45 is recessed into roller 40 to allow dressing of the outside working surface 54. Likewise inner convex surface 46 of roller 40 is shaped so as not to interfere with the dressing operation of the inside working surface 52 of wheel 50 and permit dressing of the generating type. Accordingly, the outer concave surface has a concave configuration as illustrated in section and inner convex surface 46 has a convex surface as illustrated in section. An example of a concave surface for the purposes of this invention would be the inside surface of a cone or sphere and an example of a convex surface for the purposes of this invention would be the outside surface of a sphere or cone. Preferably the inner convex surface 46, as shown in FIG. 4, is inclined at an angle with respect to a line perpendicular to the axis $X_D$ of roller 40 in accordance with the following relationship:

$$\gamma_i = \phi_i + \beta - \alpha_i$$

wherein:

$\gamma_i$ is the inclination of inner convex surface 46 of the dressing roller with respect to a line perpendicular to the axis $X_D$ of the roller; $\phi_i$ is the pressure angle of inside working surface 52; $\beta$ is the inclination of roller axis $X_D$; and $\alpha_i$ is the clearance angle between the inside working surface 52 and inner convex surface 46 of the roller, preferably in the range of 2° to 6°.

Outer concave surface 45 of the roller is preferably inclined with respect to the same perpendicular to axis $X_D$ in accordance with the following relationship:

$$\gamma_o = \beta + \alpha_o - \phi_o$$

wherein:

$\gamma_o$ is the inclination of outer concave surface 45 of the dressing roller with respect to a line perpendicular to axis $X_D$ of the roller; $\beta$ is the inclination of axis XD; $\alpha_o$ is the clearance angle between outside working surface 54 and outer concave surface 45 of the roller, preferably in the range of 2° to 6°; and $\phi_o$ is the pressure angle of outside working surface 54.

From the above equations for $\gamma_i$ and $\gamma_o$ it follows that the difference between the respective inclinations of inner convex surface 46 and outer concave surface 45 of the dressing roller may be determined from the following relationship:

$$\Delta\gamma = (\phi_i + \phi_o) - 2\alpha$$

wherein:

$\Delta\gamma$ is the difference between the respective inclinations of inner convex surface 46 and outer concave surface 45 measured with respect to a perpendicular to axis XD of the dressing roller; angles $\phi_i$ and $\phi_o$ are the respective pressure angles of the inside (52) and outside (54) working surfaces of the grinding wheel 50; and $\alpha$ is the average clearance angle between the respective contacting surfaces of the dressing roller and grinding wheel 50 during use, preferably in the range of 2° to 6°.

Additionally, surfaces 46 and 45 are spaced so that the roller 40 has sufficient structural strength to provide rigid support during the dressing operation. The amount of spacing between surfaces 46 and 45 is substantially determined by radius R which is preferably about 0.254 cm (0.1 inch).

It may also be appreciated that since the opposite (inside 52 and outside 54) working surfaces of the grinding wheel 50 are respectively dressed by opposite (inner 46 and outer 45) surfaces of the dressing roller. The same directions of relative rotation between the grinding wheel 50 and dressing roller are maintained during dressing operations on both sides of the grinding wheel 50. Thus, the rotary dressing roller may be rotated in a single direction for dressing both the inside working surface 52 and the outside working surface 54 of grinding wheel 50.

A description of the operation of the dressing apparatus 15 will now be discussed. Referring to FIG. 4, dressing apparatus 15 is positioned such that rotational axis XD of the rotary dressing roller 40 is oriented at an angle $\beta$ when it contacts the maximum working depth of the grinding wheel 50. In the embodiment illustrated, grinding wheel 50 has substantially straight inside working surface 52 in cross section. Accordingly, once the rotary dressing roller 40 is positioned to its cutting depth, rotary dressing roller 40 is simply moved in a direction parallel to inside working surface 52 of the grinding wheel 50 toward the outer end (see FIG. 6a). If inside working surface 52 is something other than a straight line in cross section, the contact normal point CN will move along the surface 47 as required by the surface of the grinding wheel 50. The same procedure is provided for dressing outside working surface 54 of grinding wheel 50. Since rotary generating roller 40 is rotated in a single direction, the entire profile of the grinding wheel 50 can be generated without removing the roller 40 from contact with grinding wheel 50. As the roller reaches the outer end of inside working surface 52 it may continue around the end of grinding wheel 50 on to outside working surface 54 traveling toward point B. However, it is preferred that inside working surface 52 and outside working surface 54 each be dressed by initially contacting each surface beyond its maximum working depth and dressed in a direction toward the outer end.

A rotary generating dressing roller made in accordance with the present invention need only be rotated in a single direction for dressing both sides of the grinding wheel 50 thereby avoiding the problems of prior art. Additionally because of the roller's configuration, the roller need only be moved in a single plane thereby avoiding any unnecessary pivoting of the dressing roller that may be required in a single point cutting tool or rotary dressing roller of the prior art. This enables use of a simpler mechanism for moving dressing roller thereby improving efficiency and accuracy of the dressing process.

It may also be appreciated that because the inner and outer cutting surfaces for dressing opposite side working surfaces of the grinding wheel 50 are closely spaced, the required travel of the dressing roller in a direction perpendicular to the grinding wheel 50 axis for dressing both sides of the grinding wheel 50 is minimized. It is comtemplated that the amount of required travel be significantly less than the travel required of known rotary dressing rollers of the generating type according to the following relationship:

$$T < W_T + D_x X \cos(\phi)$$

wherein:

T is equal to the required travel of the dressing roller in a direction perpendicular to the grinding wheel 50 axis XD for dressing both the inside and outside working surfaces of the grinding wheel 50; $W_T$ is the thickness of the grinding wheel 50 at the maximum working depth (i.e., the distance between points A and B illustrated in FIGS. 4 and 5); $D_x$ is the diameter of the dressing roller; and cos ($\phi$) is the cosine function of the average pressure angle of the inside and outside working surfaces of the grinding wheel 50.

Preferably, the amount of required travel of the dressing roller 40 between dressing positions A and B on opposite side surfaces of the grinding wheel 50 is approximately equal to the following relationship:

$$T_{AB} \leq W_T + 2R$$

wherein:

$T_{AB}$ is equal to the required travel of the dressing roller in a direction perpendicular to the grinding wheel axis XD between points A and B at the maximum working depth of the grinding wheel 50; $W_T$ is the thickness of the grinding wheel 50 at the maximum working depth; and R is the radius of the cutting rim.

Referring to FIG. 9 there is illustrated a rotary dressing roller 40 made in accordance with the present invention used to dress a "straddle type" cup grinding wheel 150. Straddle grinding wheel 150 has an inner cutting rim 152 and an outer cutting rim 154. The inner cutting rim 152 has an outside working surface 156 and inside clearance surface 157. Outer cutting rim 154 has an outside clearance surface 158 and an inside working surface 159 which faces surface 156. The inner cutting rim 152 is spaced a relative short distance from outer cutting rim 154 for grinding opposite sides of a gear tooth. Accordingly, it would not be possible to dress surfaces 156 or 159 of grinding wheel 150 with a known generating type roller because of the interference between the roller and the working surface opposite the surface to be dressed. A rotary dressing roller made in accordance with the present invention has a configuration which allows orientation of the roller which permits dressing of the outer surface 156 of inner cutting rim 152 and inside surface 159 of outer cutting rim 154. Additionally, the amount of travel perpendicular to the axis of grinding wheel 50 required by a roller of the present invention is minimal.

Referring to FIGS. 10, 11, 12 there are illustrated various modified configuration of the rotary dressing rollers made in accordance with present invention. The rotary dressing roller illustrated in FIG. 10 is similar to configuration of the illustrated in FIGS. 3 and 4 except that the outer working portion is substantially smaller in diameter. FIGS. 11 and 12 illustrate various other configurations of the working portion of a dressing roller made in accordance with the present invention. Various other configurations may be used as required.

Various modifications and changes may be made without departing from the scope of the present invention. For example, but not by way of limitation, the inner convex surface 46 and outer convex surface 45 may take other shapes other than straight as illustrated.

What is claimed is:

1. A rotary dressing roller for dressing inside and outside working surfaces of a substantially cup-shaped grinding wheel for longitudinally curved tooth gears comprising:

a base portion for mounting said rotary dressing roller for rotation about an axis of said dressing roller; and a working portion formed at one end of said base portion having an outer concave surface, an inner convex surface and an outer cutting rim portion connecting said outer concave surface and said inner convex surface;

wherein said outer cutting rim portion has an inner cutting surface and an outer cutting surface, said inner cutting surface having an effective radius of curvature at a first point of contact with the grinding wheel at a maximum working depth of the grinding wheel less than a normal radius of curvature of the inside working surface of the grinding wheel at the first point of contact with said dressing roller at the maximum working depth, and said outer cutting surface having an effective radius of curvature at a second point of contact with the grinding wheel at the working depth of the grinding wheel greater than a normal radius of curvature of the outside working surface of the grinding wheel at the second point of contact with said dressing roller at the maximum working depth.

2. A rotary dressing roller according to claim 1 wherein said effective radius of curvature of said inner cutting surface is no greater than about 80 per cent of the normal radius of curvature of the inside working surface of the grinding wheel at the first point of contact with said dressing roller at the maximum working depth.

3. A rotary dressing roller according to claim 2 wherein said effective radius of curvature of said outer cutting surface is equal to or greater than 1.25 times the normal radius of curvature of the outside working surface of the grinding wheel at the second point of contact with said dressing roller at the maximum working depth.

4. A rotary dressing roller for dressing inside and outside working surfaces of a substantially cup-shaped grinding wheel for longitudinally curved tooth gears comprising:

a base portion for mounting said rotary dressing roller for rotation about an axis of said dressing roller; and a working portion formed at one end of said base portion having an outer concave surface, an inner convex surface and an outer cutting rim portion connecting said outer concave surface and inner convex surface;

wherein said outer cutting rim portion has an inner cutting surface and an outer cutting surface, said outer cutting rim having a configuration in accordance with the following relationship:

$$Po - Rwo \geq Rwi - Pi$$

wherein: Pi is an effective radius of curvature of said inner cutting surface of said rotary dressing roller at a first point of contact with the grinding wheel at a maximum working depth of the grinding wheel; Po is an effective radius of curvature of said outer cutting surface of said rotary dressing roller at a second point of contact with the grinding wheel at the maximum working depth of the grinding wheel; Rwi is a normal radius of curvature of the inside working surface of the grinding wheel at the first point of contact with said dressing roller at the maximum working depth; and, Rwo is a normal radius of curvature of the outside working surface of the grinding wheel at the second point of contact with said dressing roller at the maximum working depth.

5. A rotary dressing roller according to claim 4 wherein said outer concave surface of said dressing roller together with the outside working surface of the grinding wheel define a first clearance angle and said inner convex surface of said dressing roller together with the inside working surface of the grinding wheel define a second clearance angle, said first and second clearance angles being in a range of 2° to 6°.

6. A rotary dressing roller according to claim 4 wherein said outer cutting rim portion has a substantially circular cross sectional profile at least in the vicinity of the respective points of contact between said dressing roller and the grinding wheel at the maximum working depth.

7. A rotary dressing roller for dressing inside and outside working surfaces of a substantially cup-shaped grinding wheel for longitudinally curved tooth gears, the inside and outside working surfaces of the grinding wheel being inclined at respective pressure angles with respect to an axis of rotation of the grinding wheel comprising:
  a base portion for mounting said rotary dressing roller for rotation about an axis of said dressing roller; and
  a working portion formed at one end of said base portion having an outer concave surface, an inner convex surface and an outer cutting rim portion connecting said outer concave surface and inner convex surface;
  wherein said dressing roller has a diameter Dx which meets the following relationship:

$$Dx > 2Rwa \times TAN(\phi i)$$

wherein: Rwa is a radius of the grinding wheel at a maximum a working depth on the inside working surface of the grinding wheel; and $TAN(\phi i)$ is a tangent function of the pressure angle of the inside working surface of the grinding wheel at the maximum working depth.

8. A rotary dressing roller for dressing inside and outside working surfaces of a substantially cup-shaped grinding wheel for longitudinally curved tooth gears, the inside and outside working surfaces of the grinding wheel being inclined at respective pressure angles with respect to an axis of rotation of the grinding wheel comprising:
  a base portion for mounting said rotary dressing roller for rotation about an axis of said dressing roller; and
  a working portion formed at one end of said base portion having an outer concave surface, an inner convex surface and an outer cutting rim portion connecting said outer concave surface and inner convex surface;
  wherein said inner convex surface is inclined to a line perpendicular to said axis of rotation of said dressing roller through angle $\gamma i$ in accordance with the following relationship:

$$\gamma i = \phi i + \beta - \alpha i$$

wherein: $\phi i$ is the pressure angle of the inside working surface of the grinding wheel; $\beta$ is an angle of inclination of said axis of rotation of said dressing roller with respect to a line perpendicular to the axis of rotation of the grinding wheel; and $\alpha i$ is a clearance angle between the inside working surface of said grinding wheel and said inner convex surface of said dressing roller.

9. A rotary dressing roller for dressing inside and outside working surfaces of a substantially cup-shaped grinding wheel for longitudinally curved tooth gears, the inside and outside working surfaces of the grinding wheel being inclined at respective pressure angles with respect to an axis of rotation of the grinding wheel comprising:
  a base portion for mounting said rotary dressing roller for rotation about an axis of said dressing roller; and
  a working portion formed at one end of said base portion having an outer concave surface, an inner convex surface and an outer cutting rim portion connecting said outer concave surface and inner convex surface;
  wherein said outer concave surface is inclined to a line perpendicular to said axis of rotation of said dressing roller through angle $\gamma o$ in accordance with the following relationship:

$$\gamma o = \beta + \alpha o - \phi o$$

wherein: $\beta$ is an angle of inclination of said axis of rotation of said dressing roller with respect to a line perpendicular to the axis of rotation of the grinding wheel; $\alpha o$ is a clearance angle between the outside working surface of the grinding wheel and said outer concave surface of said dressing roller; and $\phi o$ is the pressure angle of the outside working surface of the grinding wheel.

10. A rotary dressing roller for dressing inside and outside working surfaces of a substantially cup-shaped grinding wheel for longitudinally curved tooth gears, the inside and outside working surfaces of the grinding wheel being inclined at respective pressure angles with respect to an axis of rotation of the grinding wheel comprising:
  a base portion for mounting said rotary dressing roller for rotation about an axis of said dressing roller; and
  a working portion formed at one end of said base portion having an outer concave surface, an inner convex surface and an outer cutting rim portion connecting said outer concave surface and inner convex surface;
  wherein a difference angle $\Delta \gamma$ is defined between respective inclination angles of said inner convex surface and said outer concave surface with respect to a line perpendicular to said axis of rotation of said dressing roller in accordance with the following relationship:

$$\Delta \gamma = (\phi i + \phi o) - 2\alpha$$

wherein: $\phi i$ and $\phi o$ are the respective pressure angles of the inside and outside working surfaces of the grinding wheel; and $\alpha$ is the average of two clearance angles, one clearance angle being defined between the inside working surface of the grinding wheel and said inner convex surface of said dressing roller and the other of said two clearance angles being defined between the outside working surface of the grinding wheel and said outer concave surface of said dressing roller.

11. A rotary dressing roller according to claim 1 wherein said outer cutting rim portion has a substantially circular cross sectional profile at least in the vicinity of the respective points of contact between said dressing roller and the grinding wheel at the maximum working depth.

12. A rotary dressing roller according to claim 1 wherein said rotary dressing roller further comprises a neck portion between said base portion and said working portion for providing clearance between said dressing roller base portion and the grinding wheel during use.

13. A rotary dressing roller according to claim 11 wherein said cutting rim portion comprises a layer of diamond grit.

14. A rotary dressing roller according to claim 1 wherein said outer concave surface of said dressing roller together with the outside working surface of the grinding wheel define a first clearance angle and said inner convex surface of said dressing roller together with the inside working surface of the grinding wheel define a second clearance angle, said first and second clearance angles being in a range of 2° to 6°.

15. A rotary dressing roller according to claim 1 wherein the grinding wheel is a straddle grinding wheel having concentric inner and outer rims, the inner rim including the outside working surface, the outer rim including the inside working surface.

16. A rotary dressing roller according to claim 10 wherein said dressing roller has a diameter Dx which meets the following relationship:

$$Dx > 2Rwa \times TAN(\phi i)$$

wherein: Rwa is a radius of the grinding wheel at the maximum working depth on the inside working surface of the grinding wheel and TAN ($\phi i$) is a tangent function of the pressure angle of the inside working surface of the grinding wheel at the maximum working depth.

17. A rotary dressing roller according to claim 1 wherein the inside and outside working surfaces of the grinding wheel are inclined at respective pressure angles with respect to an axis of rotation of the grinding wheel and a difference angle $\Delta\gamma$ is defined between respective inclination angles of said inner convex surface and said outer concave surface with respect to a line perpendicular to said axis of rotation of said dressing roller in accordance with the following relationship:

$$\Delta\gamma = (\phi i + \phi o) - 2\alpha$$

wherein: $\phi i$ and $\phi o$ are the respective pressure angles of the inside and outside working surfaces of the grinding wheel; and $\alpha$ is the average of two clearance angles, one clearance angle being defined between the inside working surface of said grinding wheel and said inner convex surface of said dressing roller and the other of said two clearance angles being defined between the outside working surface of the grinding wheel and said outer concave surface of said dressing roller during use.

18. A rotary dressing roller according to claim 17 wherein said dressing roller has a diameter Dx which meets the following relationship:

$$Dx > 2Rwa \times TAN(\phi i)$$

wherein: Rwa is a radius of the grinding wheel at the maximum working depth on the inside working surface of the grinding wheel and TAN ($\phi i$) is a tangent function of the pressure angle of the inside surface of the grinding wheel at the maximum working depth.

19. A dressing apparatus for dressing cup shaped grinding wheels comprising:
a rotary dressing roller for dressing inside and outside working surfaces of a substantially cup-shaped grinding wheel, the inside and outside working surfaces of the grinding wheel being inclined at respective pressure angles with respect to an axis of rotation of the grinding wheel; said dressing roller having an axis of rotation, an inner cutting surface, an outer cutting surface and a circular contour rim connecting said inner and outer cutting surfaces;
means for rotating the grinding wheel about its axis;
means for rotating said dressing roller about its axis;
means for moving said dressing roller with respect to the grinding wheel to effect dressing of the working surfaces of the grinding wheel; and
said dressing roller axis being angularly oriented through angle $\beta$ with respect to a plane perpendicular to the axis of rotation of the grinding wheel in a range between $\beta$min and $\beta$max according to the following relationships:

$$\beta max = \text{Arcsin} \frac{(.5 Dx - R)}{(1.25 Rwo + R)} + \phi o$$

and $$\beta min = \text{Arcsin} \frac{(.5 Dx - R)}{(.80 Rwi - R)} - \phi i$$

wherein: Rwi is a normal radius of curvature of the inside working surface of the grinding wheel at a working depth of the grinding wheel; Rwo is a normal radius of curvature of the outside working surface of the grinding wheel at a working depth of the grinding wheel; R is a radius of said circular contour rim of said dressing roller; $\phi i$ and $\phi o$ are the respective pressure angles of the inside and outside working surfaces of the grinding wheel; and Dx is the diameter of said dressing roller.

20. A dressing apparatus according to claim 19 wherein the diameter Dx of said dressing roller is defined such that the angle $\beta$max is greater than $\beta$min.

21. A dressing apparatus according to claim 20 wherein the diameter Dx of said dressing roller which meets the following relationship:

$$Dx > 2Rwa \times TAN(\phi i)$$

wherein: Rwa is a radius of the grinding wheel at the maximum working depth on the inside working surface of the grinding wheel and TAN ($\phi i$) is the tangent function of the pressure angle of the inside working surface of the grinding wheel at the maximum working depth.

22. The dressing apparatus of claim 20 wherein said means for moving said dressing roller with respect to the grinding wheel to effect dressing of the working surfaces of the grinding wheel provides for a range of relative travel T of said dressing roller with respect to the grinding wheel perpendicular to the axis of the grinding wheel.

23. The dressing apparatus of claim 22 wherein said travel T required to move said dressing roller with respect to the grinding wheel for generating both the inside and outside working surfaces of the grinding wheel in a direction perpendicular to the grinding wheel axis is limited according to the following relationship:

$$T < W_T + Dx \times \cos(\phi)$$

wherein: $W_T$ is the thickness of the grinding wheel at the working depth; Dx is a diameter of said dressing roller; and $\cos(\phi)$ is a cosine function of an average pressure angle of the respective pressure angles of the inside and outside working surfaces of the grinding wheel.

24. The dressing apparatus of claim 22 wherein said means for moving said dressing roller with respect to the grinding wheel to effect dressing of the working surfaces of the grinding wheel provides for a range of relative travel of said dressing roller with respect to the grinding wheel in a direction along the axis of the grinding wheel.

25. A method of dressing inside and outside working surfaces of a substantially cup-shaped grinding wheel for longitudinally curved tooth gears with a rotary dressing roller, the inside and outside working surfaces of the grinding wheel being inclined at respective pressure angles with respect to an axis of rotation of the grinding wheel, said rotary dressing roller having a base portion for mounting the rotary dressing roller for rotation about an axis of said dressing roller and a working portion formed at one end of said base portion including an outer concave surface, an inner convex surface and an outer cutting rim portion connecting said outer concave surface and said inner convex surface; wherein said outer cutting rim portion has an inner cutting surface and an outer cutting surface, said inner cutting surface having an effective radius of curvature at a working depth of the grinding wheel less than a normal radius of curvature of the inside working surface of the grinding wheel at a point of contact with said dressing roller at the working depth, and said outer cutting surface having an effective radius of curvature at the working depth of the grinding wheel greater than a normal radius of curvature of the outside working surface of the grinding wheel at a point of contact with said dressing roller at the working depth, comprising the steps of:
rotating the grinding wheel and said dressing roller about their respective axes in the same respective directions while dressing both the inside and outside working surfaces of the grinding wheel, and
moving said dressing roller with respect to the grinding wheel for generating both the inside and outside working surfaces of the grinding wheel.

26. A method of dressing a cup-shaped grinding wheel according to claim 25 including the step of:
orienting said axis of rotation of said dressing roller with respect to a line perpendicular to the axis of rotation of the grinding wheel through a fixed angle $\beta$ while dressing at least one of the inside and outside working surfaces of the grinding wheel.

27. A method of dressing a cup-shaped dressing wheel of claim 26 wherein said rotary dressing roller remains substantially in contact with the grinding wheel and said axis of rotation of said dressing roller remains oriented with respect to the line perpendicular to the axis of rotation of the grinding wheel through the fixed angle $\beta$ while dressing both the inside and outside working surfaces of the grinding wheel.

28. A method of dressing a cup-shaped grinding wheel according to claim 27 further comprising the step of:
initially contacting the grinding wheel with said rotary dressing roller below the maximum cutting depth of one of the working surfaces of the grinding wheel.

29. A method of dressing a cup-shaped grinding wheel according to claim 25 wherein travel T required to move said dressing roller with respect to the grinding wheel for generating both the inside and outside working surfaces of the grinding wheel in a direction perpendicular to the grinding wheel axis is limited according to the following relationship:

$$T < W_T + Dx \times \cos(\phi)$$

wherein: $W_T$ is the thickness of the grinding wheel at the maximum working depth; Dx is the diameter of said dressing roller; and $\cos(\phi)$ is a cosine function of an average pressure angle of the respective pressure angles of the inside and outside working surfaces of the grinding wheel.

30. A method of dressing a cup-shaped grinding wheel according to claim 29 wherein travel $T_{AB}$ required to move said dressing roller from a point of contact A with one of the working surfaces of the grinding wheel at the working depth to a point of contact B with the other of the working surfaces of the grinding wheel at the working depth in a direction perpendicular to the grinding wheel axis is limited according to the following relationship:

$$T_{AB} \leq W_T + 2R$$

wherein R is the radius of said outer cutting rim portion of said dressing roller.

31. A method of dressing inside and outside working surfaces of a substantially cup-shaped grinding wheel according to claim 25 wherein said dressing roller axis is angularly oriented through angle $\beta$ with respect to a plane perpendicular to the axis of rotation of the grinding wheel in a range between $\beta$min and $\beta$max according to the following relationships:

$$\beta\text{max} = \text{Arcsin} \frac{(.5\,Dx - R)}{(1.25\,Rwo + R)} + \phi o$$

and $$\beta\text{min} = \text{Arcsin} \frac{(.5\,Dx - R)}{(.80\,Rwi - R)} - \phi i$$

wherein: Rwi is a normal radius of curvature of the inside working surface of the grinding wheel at a working depth of the grinding wheel; Rwo is a normal radius of curvature of the outside working surface of the grinding wheel at a working depth of the grinding wheel; R is a radius of said circular contour rim of said dressing roller; $\phi i$ and $\phi o$ are the respective pressure angles of the inside and outside working surfaces of the grinding wheel; and Dx is the diameter of said dressing roller.

32. A method of dressing inside and outside working surfaces of a substantially cup-shaped grinding wheel according to claim 31 wherein the diameter Dx of said dressing roller is defined such that the angle $\beta$max is greater than $\beta$min.

* * * * *